(12) United States Patent  (10) Patent No.: US 7,676,458 B2
Aggarwal et al.  (45) Date of Patent: Mar. 9, 2010

(54) SYSTEM AND METHOD FOR HISTORICAL DIAGNOSIS OF SENSOR NETWORKS

(75) Inventors: Charu Chandra Aggarwal, Mohegan Lake, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 11/846,397

(22) Filed: Aug. 28, 2007

(65) Prior Publication Data

US 2009/0063432 A1  Mar. 5, 2009

(51) Int. Cl.
G06F 7/00 (2006.01)
G06F 17/30 (2006.01)
G06F 15/173 (2006.01)
G06F 15/177 (2006.01)

(52) U.S. Cl. .............................. 707/3; 709/224; 715/736
(58) Field of Classification Search ....................... 707/3; 709/224; 715/736
See application file for complete search history.

(56) References Cited

U.S. PATENT DOCUMENTS

2007/0150565 A1* 6/2007 Ayyagari et al. ............ 709/223
2007/0237410 A1* 10/2007 Cormode et al. ............ 382/240
2007/0240061 A1* 10/2007 Cormode et al. ............ 715/736

OTHER PUBLICATIONS

Graham Cormode et al., Holistic Aggregates in a Networked World: Distributed Tracking of Approximate Qunatities, Jun. 16, 2005, SIGMOD ACM, pp. 1-12.*
Graham Cormode et al., Sketching Streams through the Net: Distributed Approximate Query Tracjubg, Sep. 2, 2005, 31st VLDB Conference, 13-24.*
Graham Cormode et al., An Improved Data Stream Summary: The count-min sketch and its applications, 2004 pp. 1-11.*
Amol Deshpande, Model-Driven Data Aquisition in Sensor Networks, 2004, 30th VLDB Conference, pp. 588-599.*
Noga Alon, et al., "The Space Complexity of Approximating the Frequency Moments," pp. 1-19, dated Feb. 22, 2002.

* cited by examiner

*Primary Examiner*—James Trujillo
*Assistant Examiner*—Jeffrey A Burke
(74) *Attorney, Agent, or Firm*—F. Chau & Associates, LLC

(57) ABSTRACT

A method of querying a hierarchically organized sensor network, said network being sensor network with a global coordinator node at a top level which receives data from lower level intermediate nodes which are either leader nodes for lower level nodes or sensor nodes, wherein a sensor node i at a lowest level receives a signal $Y(i,t)$ at time t, said method including constructing a sketch $S_{wkt} = (S_{wkt}^1, \ldots, S_{wkt}^n)$ for an internal node k from $$S_{wkt}^j = \sum_{i \in LeafDescendants(k)} \sum_{q=1}^{i} b_{wiq} \cdot r_{iq}^j,$$

wherein component $S_{wkt}^j$ is a sketch of a descendent of node k, $r_{it}^j$ is a random variable associated with each sensor node i and time instant t wherein index j refers to independently drawn instantiations of the random variable, bit $b_{wit}$ represents a state of sensor node i for signal value $w=Y(i,t)$ at time t, and LeafDescendents(k) are the lowest level sensor nodes under node k, wherein said sketch is adapted for responding to queries regarding a state of said network.

19 Claims, 7 Drawing Sheets

SYSTEM AND METHOD FOR HISTORICAL DIAGNOSIS OF SENSOR NETWORKS

This invention was made with Government support under Contract No.: H98230-05-03-0001 awarded by Intelligence Agencys. The Government has certain rights in this invention.

TECHNICAL FIELD

This disclosure is directed to the historical analysis of large sensor networks.

DISCUSSION OF THE RELATED ART

Recent advances in hardware technology have made it feasible to collect large amounts of data from the physical world using small sensor nodes. These sensor nodes have become smaller and cheaper over the years, though they are typically limited by low computational power and memory. In addition, communication is a huge cost on battery power, and therefore limits on battery life can reduce the life time of the sensor network. The large amounts of data collected by the sensor nodes causes monitoring to be challenging from many technological stand points. Sensor nodes have limited local storage, computational power, and battery life, as a result of which it is desirable to minimize the storage, processing and communication from these nodes. The issue is further magnified by the fact that a given network may have millions of sensor nodes and therefore it is expensive to localize all the data at a given global node for analysis both from a storage and communication point of view. A typical monitoring application may determine specific abnormalities at sensor nodes or diagnose local regions of abnormal behavior. In other applications, a user may wish to query the network for specific behavior of the data over arbitrary time horizons. This can be a challenging task if it is not possible to store the voluminous sensor information at different nodes, and if there are limitations on communicating this data to storage locations because of limitations on power consumption.

In general, it is useful to have the flexibility of computing a number of general function on any historical portion of the data stream. This is also a challenging task, because it may be impossible to hold the entire historical data at different sensor nodes under the corresponding storage constraints. A recent technique for compressing historical information in sensor networks is focused on dimensionality reduction of multiple streams with the use of inter-attribute correlations. This method, however, cannot be easily used for arbitrary reconstruction of the data stream (or functions of it) over particular time horizons.

In many applications, sensor nodes may be hierarchically organized with intermediate nodes sending aggregate information about lower level nodes to upper level nodes. Since nodes at lower levels of the hierarchy are more numerous, they will have greater constraints in terms of storage or power consumption. In many cases, the intermediate nodes may also be considerably constrained in resources.

SUMMARY OF THE INVENTION

Exemplary embodiments of the invention as described herein generally include methods and systems for storage-efficient monitoring and diagnosis of sensor networks with the use of sketch based representations. A system and method according to an embodiment of the invention provides a flexible scheme for summary storage of sensor signals in order to effectively deal with the different kinds of tradeoffs. A pyramidal sketch can store the historical signals from different sensors effectively, so that it is able to accurately respond to user queries over different time horizons. A sketch based representation reduces the space requirements while providing worst-case guarantees on general functions computed over the sensor stream. A method according to an embodiment of the invention does not rely on special characteristics of the data stream, and can effectively summarize data streams of the order of hundreds of gigabytes in a few megabytes. In addition, the scheme can accurately reconstruct any historical part of the series and effectively compute general functions on the series.

A method according to an embodiment of the invention can exploit the hierarchy in the sensor network. The storage at intermediate nodes in the hierarchy is designed so that queries at the global level can be resolved at varying levels of accuracy by using sketches which are aggregated across different sensor nodes at upper levels of the hierarchy. While it may not always be possible to maintain detailed sketches at the highest level node because of storage constraints, it is often possible to reconstruct the historical behavior of the sketch at the higher level nodes using this approach. This helps in resolving the query at the higher level nodes without needing the extra communication of pushing queries down to lower level nodes.

A method according to an embodiment of the invention can construct pyramidal sketches which store the entire historical behavior of the sensor readings in an effective way, and is effective in tracking very detailed historical behavior of individual series values, because of the use of a pyramidal time frame technique in combination with the sketch. Experimental results are presented illustrating the effectiveness of an approach.

DETAILED DESCRIPTION OF PREFERRED EMBODIMENTS

Exemplary embodiments of the invention as described herein generally include systems and methods for historical analysis of large sensor networks. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

According to an embodiment of the invention, a hierarchically organized sensor network is provided. At the top level of the hierarchy is the global coordinator node, which receives data from lower level intermediate nodes. These intermediate nodes may themselves be leader nodes for other lower level nodes or sensor nodes. The ancestor of a node i in the hierarchy is denoted by Parent(i). The set of descendents of a given node are denoted by Desc(i). The set of leaf descendents of a given node are the lowest level sensor nodes under it, and are denoted by LeafDesc(i).

For presentation purposes, it is assumed that node i at the lowest level of the hierarchy receives a signal Y(i,t) at time stamp t. Some examples of relevant queries for a sensor network system are as follows:

- For a given time horizon of length h, determine the average signal value for a given sensor node.
- For a given time horizon of length h, determine the number of abnormally large signal occurrences in a given set of sensors.
- For a given historical time instant, determine the exact signal value.
- For a given time horizon of length h, determine the distance in the signal between two sensor nodes.

Note that some of the queries are posed for specific historical horizons or at specific historical instants. Other queries may compute functions over a set of stream sensors, or may try to extract a function on a single sensor with the use of an aggregated sketch at the higher level. Therefore, a mechanism should be constructed to store the data in such a way that the relevant sketch behavior can be extracted. Considerations for construction of the distributed synopsis involve several tradeoffs:

- For a given query, one would like to resolve it at higher levels of the tree, so as to minimize the communication costs at lower level nodes.
- It is desired to maximize the aggregation at different levels of the hierarchy, so as to minimize the total storage and communication at higher levels.

Quantization of Sensor Signals

Since most sensor applications are deployed in the context of known physical phenomena, the normal statistical behavior of the signals can often be measured and stored a-priori. Let $\mu$ be the mean of a particular signal, and $\sigma$ be the corresponding standard deviation. A first step is to construct a normalized signal $z_i(t)$ for node i for each interval value Y(i,t) using the following relationship:

$$z_i(t) = \frac{(Y(i,t) - \mu)}{\sigma}.$$

The value of $z_i(t)$ will lie in a small range most of the time. For arbitrary distributions, the Chebychev inequality implies that the probability of $|z_i(t)|$ being larger than k is less than $1/k^2$. For each sensor node i, the normalized signals are quantized through the range [-a, a], where an exemplary, non-limiting value of a is about 3. For each sensor node, the signal is quantized into $\Phi-2$ intervals of equal length. Values outside the range [-a, a] are quantized into two separate intervals. In general, the value of a should be chosen such that none (or very few) of the sensor signals lie outside the range [-a, a]. Thus, a total of $\Phi$ intervals are constructed for each signal at a sensor node.

Signal Reception and Communication

At each clock tick, one first determines an interval of a sensor signal, referred to herein below as a bucketid, from the quantization. This bucketid is drawn from the range [1, $\Phi$]. It is used to send a ⟨tickid,bucketid⟩ pair to the node at the next higher level. While it would seem that a sensor measurement needs to be sent at each tick, it is possible to reduce communication costs further. The ⟨tickid,bucketed⟩ pair is sent only if the bucketid has changed since the last tick. Otherwise the sensor reading is implicitly set to that at the last tick. In many stable applications, sensor measurements change only gradually over time. Therefore, for most ticks, no communication may need to be sent by the sensor nodes. This is a useful saving, since sensor nodes are usually highly constrained by battery costs. According to an embodiment of the invention, each sensor node communicates to its next higher level leader nodes.

A given leader node may receive communication from a large number of sensor nodes. At higher level nodes, a list of triplets ⟨tickid, sensorid, bucketid⟩ can be sent to the next higher level. The sending of the additional information corresponding to the sensorid is necessary in order to identify the node whose signal bucket is currently being updated. For a given node, one only needs to send the data for a subset of the sensor nodes, which are descendents of the given node. As in the previous case, one needs to communicate the triplets only for those nodes for which the bucket identifier has changed since the last tick.

According to an embodiment of the invention, a temporal adaptation of the sequence $$F_k = n \sum_{i=1}^{} m_i^k$$

where $k \geq 0$, $m_i = |\{j : a_j = i\}|$ is the number of occurrences in a sequence $A = (a_1, \ldots, a_m)$ where $a_i \in \{1, \ldots, n\}$, is used in conjunction with a specific temporal pattern of storage which is referred to herein below as a pyramidal time frame. A random variable $r_{it}^j$ is associated with each sensor node i and time instant (tick) t. The index j refers to independently drawn instantiations of the random variable, and is required to construct different components of the sketch. Each random variable is drawn from $\{-1, 1\}$ using a pseudo-random number generator.

For each signal value $w = z_i(t)$ in $\{1, \ldots, \Phi\}$, the bit $b_{wit}$ in $\{0, 1\}$ represents the state of sensor node i for bucket w and time t. The value of $b_{wit}$ is 1 for only one value of w in $\{1, \ldots, \Phi\}$ (and fixed (i,t)). For each internal node k and w in $\{1, \ldots, \Phi\}$, the sketch $\overline{S}_{wkt} = (S_{wkt}^1, \ldots, S_{wkt}^n)$ is maintained for the n descendent leaf nodes of k. The component $S_{wkt}^j$ of the sketch is defined as follows:

$$S_{wkt}^j = \sum_{i \in LeafDesc(k)} \sum_{q=1}^{i} b_{wiq} \cdot r_{iq}^j. \qquad (1)$$

For each node k, n·k sketch components are maintained for each of the quantized ranges w in $\{1, \ldots, \Phi\}$. Thus, there are a total of n·k·Φ sketch components. The value of n·k influences the guarantees on the accuracy of the prediction, discussed in greater detail below. Note that the immediate sketches for the lowest level sensor includes should be stored at the parent nodes, because of the very limited memory and storage available at the lowest level. The sketches for all other nodes are stored directly at the node itself.

Temporal Storage Patterns

One issue is the choice of temporal storage of sketch snapshots, useful for querying over user-driven time horizons. One useful property of sketches is the subtractive property, defined as follows. Consider a data stream with sketches $\overline{S}_{wkt_1}$ and $\overline{S}_{wkt_2}$ at times $t_1$ and $t_2$ respectively. Then, a horizon specific segment sketch $\overline{SS}_{wk}(t_1, t_2)$ of the stream segment over the period $(t_1, t_2)$ is given by:

$$\overline{SS}_{wk}(t_1, t_2) = \overline{S}_{wkt_2} - \overline{S}_{wkt_1}. \qquad (2)$$

The above observation can be easily inferred from the decomposable way in which the sketches are defined in EQ. (1). This property allows the construction of sketch representations for particular horizons of the data stream. Of course, it is necessary to have stored the sketch at times $t_1$ and $t_2$ in order to construct the segment sketch. Therefore, the historical snapshots of the sketch need to be stored in order to facilitate segment-wise analysis. While a natural solution is to store the sketch snapshot at evenly spaced intervals, this can be impractical for a sensor application which may run continuously over long periods of time.

It is noted that many queries are often posed over a historical horizon of the data stream. Ideally, one would like to obtain a historical sketch of a horizon which is as close to the target horizon as possible. For this purpose, a pyramidal pattern of storage of the sketch snapshots is used. Of course, the sketch of the current time instance is always maintained dynamically in main memory. The pyramidal storage pattern is defined by constructing a set of levels across which the snapshots are stored. These levels are defined and stored as follows:

For a user-defined parameter $\alpha > 1$, snapshots at level i are stored at clock times which are divisible by $\alpha^i$;

For a user-defined integer parameter l, the last $\alpha^l$ snapshots of each level are retained at any moment in time.

There can be overlap between snapshots at different levels, if $l > 0$. In such cases, duplicates are eliminated to maximize storage efficiency. The following observations are noted:

At clock time T, the total number of levels is $\log_\alpha(T)$.

At clock time T, the total number of snapshots is at most $\alpha^l \cdot \log_\alpha(T)$.

The sketch can then be used for query estimations.

QUERY EXAMPLES

Query 1: For a given time horizon of length h, determine the number of abnormally large signal occurrences in a given part of the hierarchy (descendents of internal node k).

It can be assumed that the threshold for the abnormally large signal occurrences is one of the division points of the quantization process. For modest values of Φ, this assumption continues to remain practical. Otherwise, it is possible to perform some extrapolation within a given bucket. Let $M \subseteq \{1, \ldots, \Phi\}$ be the set representing unreasonably large absolute values of the signal. Typically, M will contain the buckets in $[1, \Phi_1]$ corresponding to the ranges with large negative values, and the buckets in $[\Phi_2, \Phi]$ corresponding to the ranges with large positive values.

One would like to resolve the query using the data stored at internal node k, rather than pushing the query down to the sensor nodes. A first step is to use the subtractive property to construct the sketch for a horizon h' which closely approximates the input horizon h. For the current time $t_c$, the snapshot at $t_c - h'$ is the closest available snapshot to that at time $t_c - h$. Subsequently, linear extrapolation can be used to obtain to the correct horizon. Since h' is extremely close to h, it follows that the boundary effects are relatively small from a practical point of view. The sketches $\overline{SS}_{wk}(t_c - h', t_c)$ are constructed for all values of $w \in M$. A sketch component $\overline{SR}_k(M, t_c - h', t_c)$ specific to set M is constructed as follows:

$$\overline{SR}_k(M, t_c - h', t_c) = \sum_{w \in M} \overline{SS}_{wk}(t_c - h', t_c) \qquad (3)$$

It can be shown that the expected number of signal ticks in M for all descendents of node k in time interval $(t_c - h', t_c)$ is given by the expected value of $$(SR_k^j(M, t_c - h', t_c))^2, \qquad (4)$$

where here the superscript j corresponds to a $j^{th}$ random sample. The sketch component is sampled multiple time in order to improve reliability.

Query 2: Determine the number of abnormal signal occurrences at a given sensor node in the time horizon $(t_c - h, t_c)$.

In this query, one is determining the number of abnormal signal ticks at a single node, potentially using the sketch at an internal node which uses an aggregated sketch across many signals. The query can in fact be resolved at any level of the sensor hierarchy. The tradeoff is that a resolution at a higher level node does not require pushing the query down to lower level nodes, thereby reducing communication. On the other hand, a resolution at a higher level node also requires a greater number of sketch components. To examine the number of sketch components required to resolve the query at an internal node k, one can perform the approximation in the range $(t_c - h', t_c)$ by using the closest snapshot (at clock time $t_c - h'$) from the target time $t_c - h$.

In order to perform the query estimation, a sketch derivative $V^j$ is defined as follows:

$$V_i^j = \sum_{q=t_c-h'}^{t_c} SR_k^j(M, t_c - h', t_c) \cdot r_{iq}^j \qquad (5)$$

It can be shown that the expected value of $V_i^j$ is the number of ticks $a_i$ with abnormally large signal occurrences at sensor node i.

Query 3: Determine the number of signal occurrences lying between specific normalized thresholds in a given part of the hierarchy for the interval $(t_c-h, t_c)$.

This query is not very different from the earlier query except that the set M may correspond to an arbitrary range rather than the normalized values which are large on an absolute basis. Therefore, the same techniques apply.

Query 4: Determine the bucketid for the signal at sensor node i at a specific historical time stamp $t_s$, using only the historical sketches stored at ancestor node k.

This query presents a challenge since it represents an attempting to estimate the sensor reading at a particular time instant at any point in the entire history of the stream. Furthermore, answering the query involves extracting the sensor reading at a particular node using only the sketch at the ancestor of that node. This sketch is presumably aggregated over the different descendent leaf nodes. The pyramidal time frame helps estimate this reading quite well in many cases. The first step is to determine the snapshots of the finest granularity $(h_1, h_2)$ which contain $t_s$. Because of the way in which the pyramidal time frame is constructed, it is possible to find, given the current time stamp $t_c$, two snapshots $(h_1, h_2)$ such that $t_s \in [h_1, h_2]$ and $h_2 - h_1 \leq \max\{1, (t_c-t_s)/\alpha^1\}$.

By examination of the behavior of snapshots with level j−1 where $l = \lfloor \log_\alpha(t_c-t_s) \rfloor$, it can be shown that if j−l>0, then $t_s$ lies between successive snapshots of this level, and the distance between successive snapshots of this level is at most $(t_c-t_s)/\alpha^j$. On the other hand, if j−l≤0, then it is possible to find a snapshot exactly at $t_s$.

In order to compute the correct bucketid for the sensor reading, one first computes the sketch derivative $F_j(M, h_1, h_2, t_s) = SR_k^j(M, h_1, h_2) \cdot r_{it_s}^j$. Let $V_{kw}(h_1, , h_2, t_s)$ be the number of sensor descendents of node k, for which the corresponding sensor readings in $[h_1, h_2]$ lie in bucket index w. Then, $$V_{kw}(h_1, h_2) = \sum_{i \in LeafDesc(k)} \sum_{q=h_1}^{h_2} b_{wiq} \qquad (6)$$

Then, when M is chosen to be $\{w\}$ for some $w \in \{1, \ldots, \Phi\}$ the expected value of $F^j(\{w\}, h_1, h_2, t_s)$ is equal to $b_{wit_s}$. The variance of Fj({w}, h1, h2, ts) is equal to $V_{kw}(h_1, h_2)$, the number of 1-bits for any sensor descendent of node k, which lie in bucket index w.

One can estimate the bucketid of a given sensor node at time $t_s$ using the same strategy of picking the median of $O(\log(1/\delta))$ copies of the averages of $O(V_{kr}(h_1, h_2))$ sketch derivatives $F^j(\{r\}, h_1, h_2)$. In general $V_{kr}(h_1, h_2)$ is the product of number of sensor nodes under k, and the average number of 1-readings in the interval $[h_1, h_2]$ and bucketid w over all leaf nodes under k. Because of the behavior of the pyramidal time frame, the value of $h_2-h_1$ is quite small, and the number of sensor readings which lie in interval r is even smaller.

The increase in the value of $V_{kr}(h_1, h_2)$ arises from the fact that node k may have a larger number of leaf descendents, if it is chosen at an upper level of the hierarchy. This reflects the natural tradeoff between pushing the query to a lower level node, or resolving the query at a higher level node with a larger number of sketch components. In general, this choice should be made depending upon the value of $h_2-h_1$ for that query. For a query with a small value of $h_2-h_1$, it may be resolved at a higher level node. Otherwise, the query may need to be pushed to a lower level node. In practice, the effectiveness of the query may be improved further, since it may often be acceptable to use an average of the signal values in the locality of $t_s$. This is especially true when the value of $(t_c-t_s)$ is large, since one does not typically desire to determine the signal at a particular time stamp in the distant history, but in the general locality of that period. In fact, if the average over a constant fraction f of the interval $[h_1, h_2]$ is used, then the number of sketch components required is no longer dependent upon the length of $[h_1, h_2]$, but upon 1/f.

Query 5: Determine the average signal value for a given sensor node i in the interval $(t_c-h, t_c)$, using the data at its ancestor node k.

As in the previous cases, one uses the snapshot at time h' which is closest to h. The average signal value for a given sensor node can be estimated by approximating the signal within each of the $\Phi$ quantized intervals to be at the midpoint of the corresponding range. In fact, the mid point of the $r^{th}$ range can be assumed to be $Q_r$. Since it has already been described how to compute the number of signal occurrences within a particular range, the average signal value can be imputed from this. Then, an approximate sketch $AS(t_1, t_2)$ of the signal can be constructed by aggregating over the different buckets. Therefore, an approximate composite sketch $\overline{AS}(t_1, t_2)$ can be defined as follows:

$$\overline{AS}_k(t_1, t_2) = \sum_{r=1}^{\Phi} \overline{SS}_{rk}(t_1, t_2) \cdot Q_r. \qquad (7)$$

The sketch derivative $P_{ik}^j$ is defined as follows:

$$P_{ik}^j(t_c - h', t_c) = (1/h') \cdot \sum_{q=t_c-h'}^{t_c} AS_k^j(t_c - h', t_c) \cdot r_{iq}^j. \qquad (8)$$

It is easy to show that the expected value of $P^j(t_c-h', t_c)$ is equal to the average value of the signal. The variance can be shown to be equal to the sum of the second moments of the signals in descendent nodes of k. The above estimate of the variance implies that it is possible to obtain an $\epsilon$-accurate result with probability at least $1-\delta$ with $O(K \cdot \log(1/\delta)/\epsilon^2)$ sketch components, where K is equal to the sum of the second moments of the signal across the different nodes. Assuming that the second moments across different nodes is similar (on a normalized basis), the number of sketch components required scales approximately linearly with the number of descendent sensor nodes. This illustrates the tradeoff between resolving the query at a lower level sensor node by using greater communication, or by resolving the query at lower level sensor nodes.

Many other closely related historical queries can be constructed from the sketch. Some examples of straightforward extensions are as follows:

Determine the average value for an arbitrary historical interval $[h_1, h_2]$.

Reconstruct the time series in moving average form for a user-defined smoothing window size W over the historical window $[h_1, h_2]$.

In many applications, moving average reconstructions of time series are more useful. For sketch applications, the use of the smoothing window of size W reduces the variance of the sketch by a factor of W, and therefore is also more efficient to estimate (with fixed bounds) by a factor of W.

Query 6: Determine the mean square distance in the signal between a pair of sensor nodes u and v for the interval $(t_c-h, t_c)$, using the data at their common ancestor k.

This query can be resolved in a number of different ways. A straightforward method to resolve the query is to use the reconstruction of the individual points used in Query 5 for the corresponding horizon and compute the difference between the two series.

Other Queries: A number of other temporal queries are possible with the pyramidal sketch stored in this example. Since the approach is capable of estimating the value of any sensor reading over any time stamp, it is also possible to use the approach for estimating a variety of functions over different time horizons. Functions which are linearly separable and averaged are typically easier to estimate with this approach.

Sketch Construction

Figure 1:
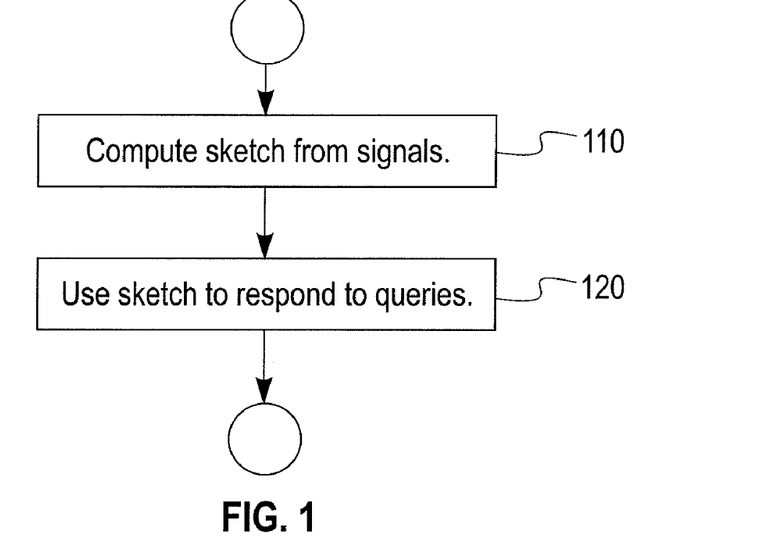
FIG. 1 is a flowchart of a method for sketch construction and query estimation, according to an embodiment of the invention.

FIG. 1 is a flowchart of a method for the overall approach for sketch construction and query estimation, according to an embodiment of the invention. Referring now to the figure, in step 110, the sketch is constructed from the signal. This construction process is performed continuously at each tick. Thus, the sketch is continuously updated. Since the sketch is represented additively in terms of its components, the corresponding operations can be performed efficiently. A detailed description of step 110 is provided in FIG. 2. In step 120, the sketch is used in order to respond to queries. The process of responding to queries entails the construction of a sketch derivative for each query and then averaging the sketch derivative over multiple components of the sketch. In order to construct the sketch derivative, a differential sketch is created over a particular horizon with the use of the subtractive property of sketches. The use of multiple components increases the robustness of the estimation process. A detailed description of step 120 is provided in FIG. 3.

Figure 2:
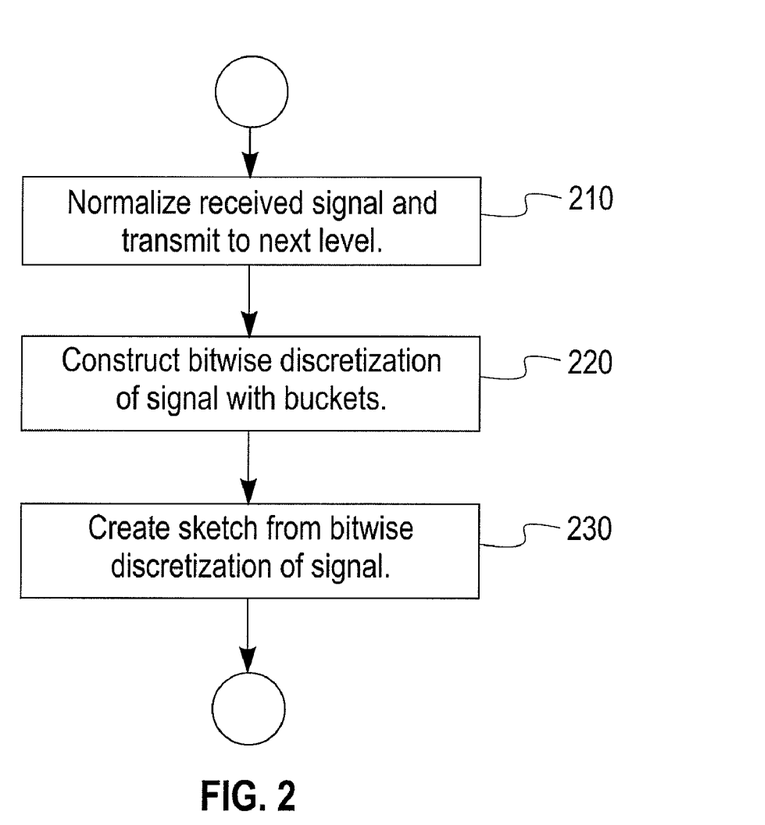
FIG. 2 is a flowchart of a method for sketch estimation of step 210 of FIG. 2, according to an embodiment of the invention.

FIG. 2 is a flowchart of details for sketch estimation of step 110 of FIG. 1, according to an embodiment of the invention. The steps illustrated in FIG. 2 are repeated continuously for each data point as it comes in. In step 210, the signal received is normalized and transmitted to the next higher level. Recall that signal normalization refers to using the mean and standard deviation of the signal value in order to create a normalized value. Therefore, the mean and standard deviation of the signals are continuously tracked over time. In step 220, the bitwise discretization of the signal is constructed with buckets. In the bitwise discretization approach, a 0-1 bit is constructed at each tick which indicates the identity of the bucket that the corresponding signal might belong. In step 230, the sketch is constructed from bitwise discretization of the signal, as specified in EQ. (1). As each component of the sketch is updated, the corresponding update is made on disk.

Figure 3:
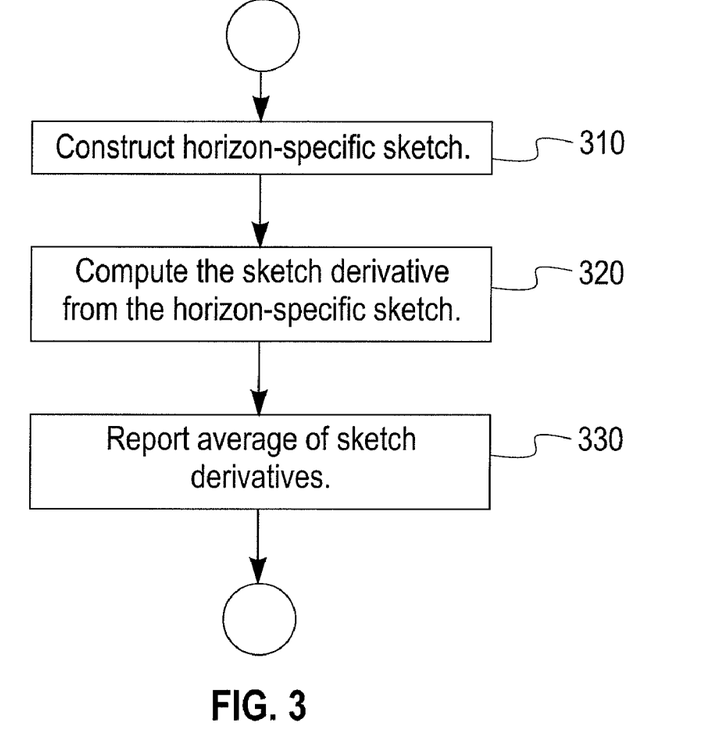
FIG. 3 is a flowchart of a method of query estimation of step 220 of FIG. 2, according to an embodiment of the invention.

FIG. 3 is a flowchart of details of query estimation of step 120 of FIG. 1, according to an embodiment of the invention. To perform the query estimation, the horizon-specific sketch is first constructed at step 310. This is done since the sketch corresponds to the entire history of the data stream and only a portion of the sketch which is relevant to a particular horizon need be extracted. To construct a horizon-specific sketch, the subtractive property is used. For example, consider the case of constructing the sketch over the horizon $(h_1, h_2)$. Let $S(h_1)$ be the sketch at time $h_1$, and $S(h_2)$ be the sketch at time $h_2$. Then, the segment sketch over $(h_1, h_2)$ is defined by $S(h_2)-S(h_1)$, as specified by EQ. (2). A detailed description of step 310 is provided in FIG. 4. In step 320, the sketch derivative is constructed for a particular query. As discussed earlier, the process of derivative construction is query-specific. Once the sketch derivative is computed, this is averaged over multiple components in step 330.

Figure 4:
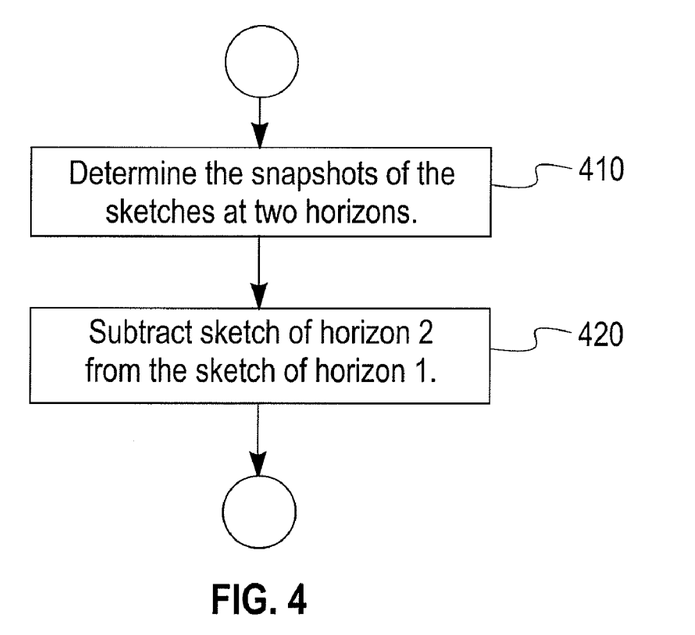
FIG. 4 is a flowchart of a method of determining a horizon specific sketch for a particular query of step 410 of FIG. 4, according to an embodiment of the invention.

FIG. 4 is a flowchart of details of determining a horizon specific sketch for a particular query of step 310 of FIG. 3, according to an embodiment of the invention. To construct the sketch-specific horizon $(h_1, h_2)$, the sketches at time instants $h_1$ and $h_2$ are determined at step 410. Let $S(h_1)$ be the sketch at the time snapshot $h_1$ and $S(h_2)$ be the sketch at the time snapshot $h_2$. Then, the sketch over the horizon $(h_1, h_2)$ is defined by $S(h_2)-S(h_1)$. This subtraction process is performed in step 420. The remaining value is reported as the corresponding sketch over the horizon $(h_1, h_2)$.

Embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
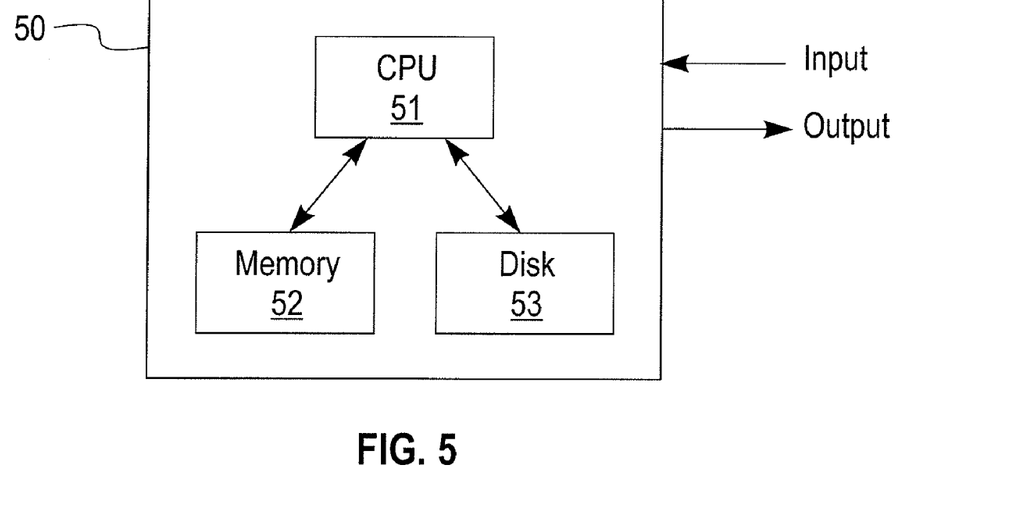
FIG. 5 is a block diagram of an exemplary computer system for implementing a system for historical analysis of large sensor networks, according to an embodiment of the invention.

FIG. 5 is a block diagram of an exemplary, non-limiting architecture for implementing a system for historical analysis of large sensor networks, according to an embodiment of the invention. Block 50 corresponds to a server at which the computations are performed. This server may be present within each sensor node, and may often not contain all the components presented here because of size constraints. The components presented here comprise one exemplary embodiment for query estimation. This is because in some cases the sensors may be small and may not contain a disk or a complete CPU. Nevertheless, a superset of the components which are required within a sensor node are presented. The server contains a CPU (51), main memory (52) and disk (53). The data which is collected by the sensor nodes is either stored in main memory (52) or disk (53). In the case of sensors, the storage ability of the sensor nodes is often limited. The computations in the sensor nodes are performed at the CPU (51). Since the sensor nodes are typically restricted in size, it is often the case that only certain kinds of computations, such as additive operations, can be performed at the sensor nodes.

Experimental Results

This section presents experimental results for a sketch-based approach according to an embodiment of the invention. An algorithm according to an embodiment of the invention was tested on a number of data sets collected from real sensor applications. The first pair of data sets was constructed from 54 sensors deployed in Intel Berkeley Research Labs. These data sets correspond to light and temperature readings from the sensors, and are denoted by Intel-L and Intel-H respectively. The second data set is the Chlorine Data Set generated by EPANET 2.0. This data stream contained 166 different sensor streams corresponding to chlorine readings at different junctions.

Since this approach is designed for historical diagnosis, different kinds of historical queries were tested with the use of the sketch based method.

The accuracy of the average function was tested for a particular sensor over a given time horizon ($t_c-h, t_c$) using an aggregate sketch over one or more sensors. This illustrated the effectiveness of using a hierarchical approach in which the sketch of the signal value was combined over different sensor nodes. These tests illustrate the effectiveness of varying levels of aggregation. This is a good indicator for the effectiveness of the method at upper levels of the increasing series size hierarchy. This approach was used for all queries discussed below.

The accuracy of determining the number of sensor signals which lie above a predefined threshold was computed. This query determines the number of abnormal signal occurrences in a given time horizon ($t_c-h, t_c$)

The accuracy of computing the exact signal value at a given tick was tested. This query is useful since it illustrates the accuracy of completely reconstructing the signal over any user driven horizon.

The accuracy of computing the $L_2$-difference between the signal at different sensor nodes over a user-specified horizon was tested.

Each dimension was quantized into $\Phi=61$ ranges, and a pyramidal pattern of sketch maintenance was used with 32 snapshots per level. Since most queries require the determination of the median of averages, two parameters medc and meanc were used to determine the number of components in the sketch. The value of meanc determines the number of copies over which the average of the sketch derivative was determined, and the median medc of such averages was returned. Therefore, the total number of sketch components was meanc×medc. For many experiments, the values medc=3, and meanc=30 were used. Therefore, it is interesting to test the storage behavior of the pyramidal sketch with respect to the size of the original series itself. One of the characteristics of the pyramidal sketch is that since the number of snapshots increases logarithmically with the series size, the corresponding storage requirement also increases logarithmically.

Figure 6:
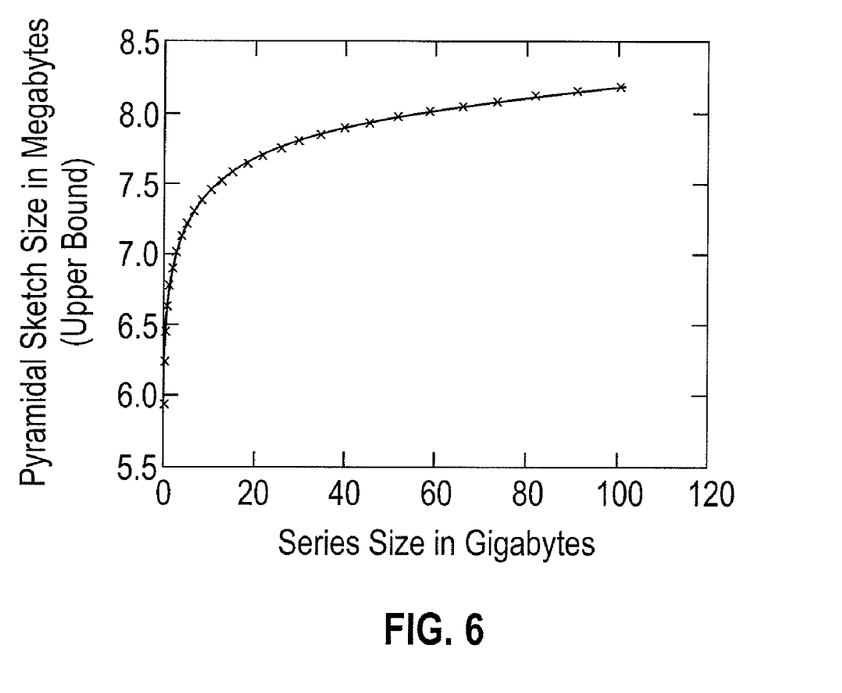
FIG. 6 illustrates the storage Requirement of a pyramidal Sketch with increasing series size, according to an embodiment of the invention.

FIG. 6 illustrates the storage requirement of a pyramidal sketch with increasing series size. The graph in the figure analytically derives an upper bound on the size of the pyramidal sketch with increasing series size. This upper bound is derived by multiplying an upper bound on the number of stored snapshots with the size of each sketch. The series size is illustrated on the X-axis and assumes 4-bytes of storage per series component, whereas the sketch size on the Y-axis assumes 4-bytes of storage per sketch component. The storage size increases only logarithmically with increasing series size. The series size on the X-axis is expressed in Gigabytes, whereas the corresponding sketch size is expressed only in Megabytes. In fact, even for a series of size up to 100 Gigabytes, the sketch size is less than 8.5 Megabytes. This result does not assume any compression across different sensor nodes. At higher level nodes the sketch from multiple sensor nodes are compressed together. In such cases, an additional compression factor is determined by the number of sensor nodes for which the signal is aggregated together. This is useful since the theoretical and experimental results will show that this sketch can be used for extensive historical analysis of the data stream.

Figure 7:
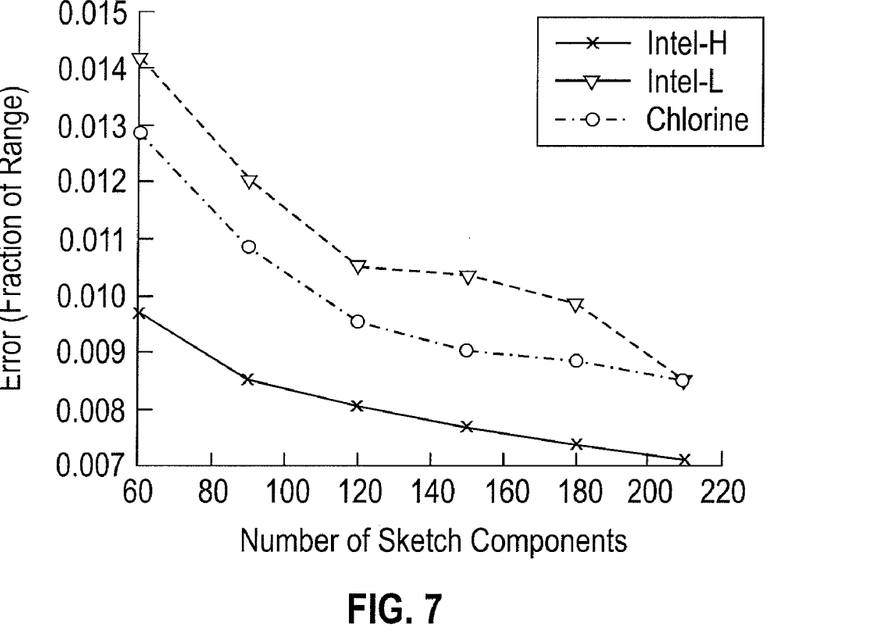
FIG. 7 illustrates an average estimation over a historical horizon using a varying number of sketch components, according to an embodiment of the invention.

Next, the quality of the estimations obtained with the use of the sketch components is discussed. FIG. 7 illustrates an average estimation over a historical horizon using a varying number of sketch components. This figure illustrates the accuracy of estimating the average value of the time series over a set of user defined horizons with lengths drawn randomly from the interval [1000, 2000]. The results were averaged over 20 such queries. In this case, the signal was aggregated over two sensor nodes. The X-axis illustrates the number of sketch components (meanc×medc), with medc fixed at 3. The Y-axis illustrates the error of estimation as a fraction of the entire range. The results are plotted for all three data sets. In each case, the accuracy increases with increasing number of sketch components. This is to be expected since the error of estimation is directly dependent upon the number of sketch components both theoretically and empirically. Furthermore, the use of a modest number of sketch components allows an error which is less than 1.5% of the entire range. In each case, the Intel-L data set showed the largest error. This was because of the wide variation in the light intensity signal at different times of the day. On the other hand, the Intel-H data set was much easier to estimate because of more stable variations of the humidity measurements.

Figure 11:
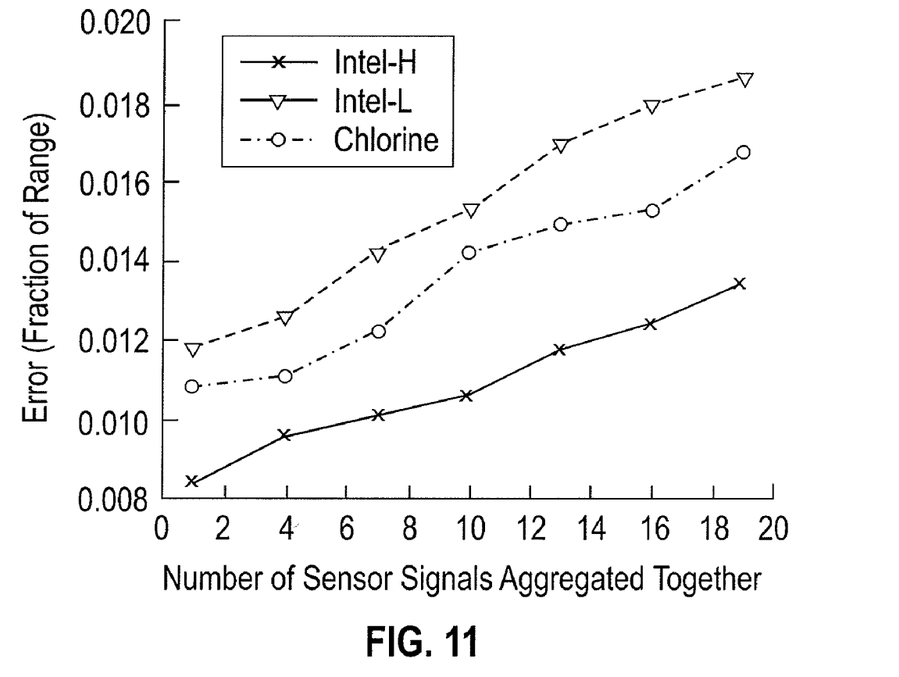
FIG. 11 depicts an average estimation over a historical horizon using a varying level of aggregation, according to an embodiment of the invention.

FIG. 11 depicts an average estimation over a historical horizon using a varying level of aggregation. This figure demonstrates the effectiveness of computing the average function by varying the number of different sensors over which the signal is aggregated. As in the previous case, a horizon was used which was drawn from the interval [1000, 2000]. The results were averaged over 20 such queries. The number of signals aggregated is illustrated on the X-axis. In this case, the number of sketch components is fixed at 90 with medc=3. This graph illustrates the effectiveness of the method for varying levels of aggregation in a hierarchical scheme. In a hierarchical scheme, upper levels would contain a larger number of sensor signals aggregated together. It is clear that increasing levels of aggregation reduce the accuracy of the method. However, the results show that the level of degradation is relatively modest in most cases. It is evident from FIG. 11 that the error is restricted to 2% of the range, even when the sketch for 20 different sensor signals is aggregated together. This shows that one can work with highly compressed sketches at higher levels of the hierarchy without having to compromise on the accuracy.

Figure 8:
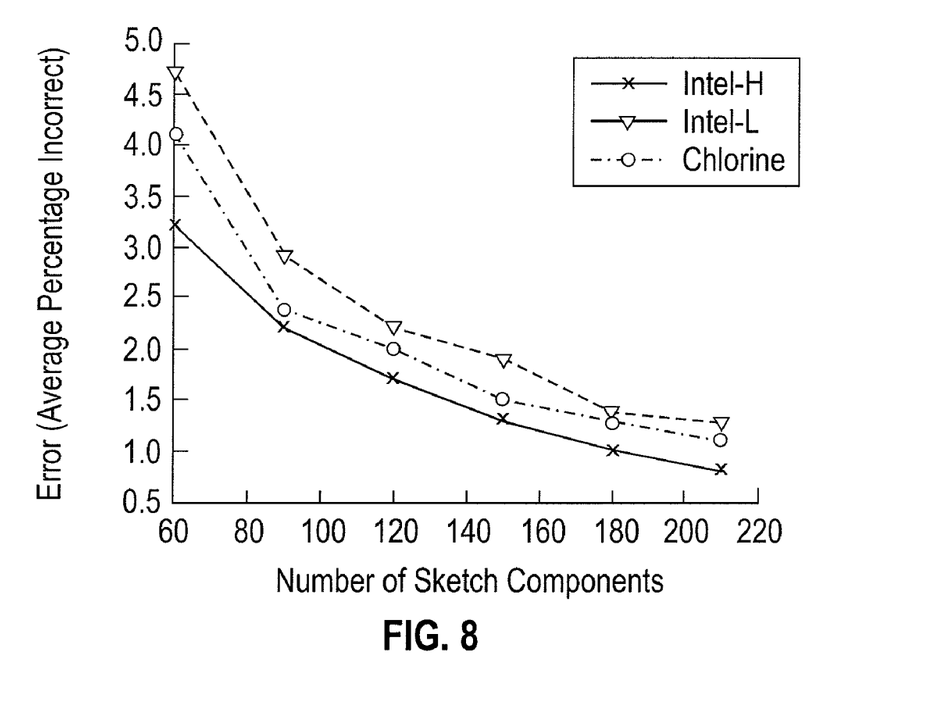
FIG. 8 illustrates an abnormal signal estimation over a historical horizon using a varying number of sketch components, according to an embodiment of the invention.

FIG. 8 illustrates an abnormal signal estimation over a historical horizon using a varying number of sketch components. The graph of this figure illustrates the behavior of the sketch in terms of its accuracy of detecting the number of ticks (or timestamps) of signals which are larger than 1.5 standard deviations away from the mean of the signal. Thus, this kind of query is effective for detecting abnormal variations of the sensor signal within a given time horizon. As in the previous case, a horizon was used which was uniformly drawn from the range [1000, 2000]. The accuracy with increasing number of sketch components is illustrated in FIG. 8. As in the previous cases, a sketch aggregated over two sensors was used, but the abnormal signals are only counted over one of the sensors. In this case, the accuracy was defined as the difference between the true number of abnormal signals and the estimated number of abnormal signals, divided by the true number of abnormal signals. In this case, the percentage inaccuracy with increasing number of sketch components is reported. In most cases, one can obtain reasonably accurate results, with the percentage error being less than 4% in most cases. When a larger number of sketch components were used, the error was reduced to less than 1% in some cases. The same order of error was retained among the three data sets as in the previous case.

Figure 12:
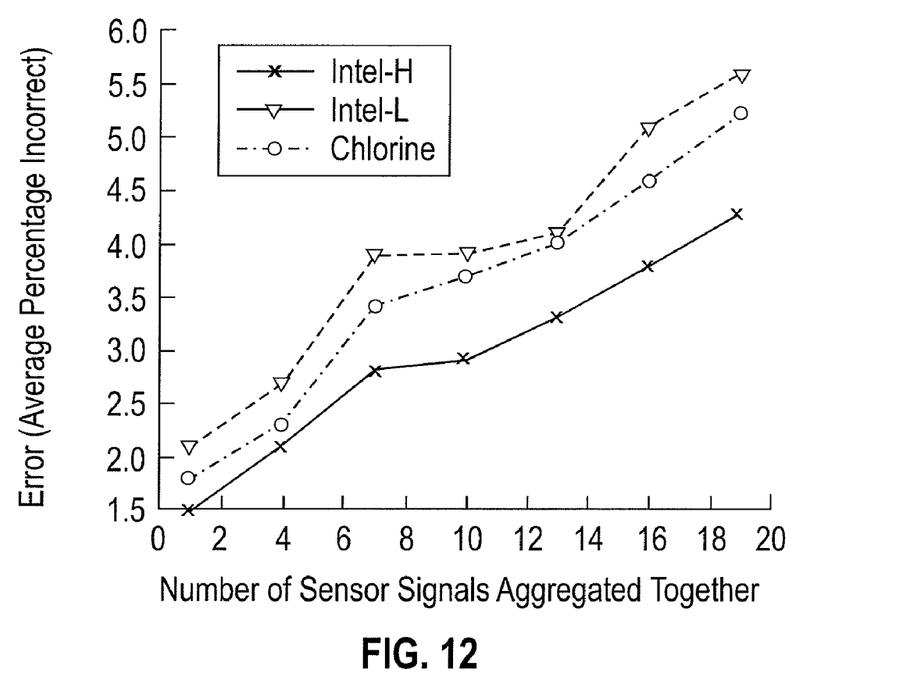
FIG. 12 illustrates an abnormal signal estimation over a historical horizon using a varying level of aggregation, according to an embodiment of the invention.

FIG. 12 illustrates an abnormal signal estimation over a historical horizon using a varying level of aggregation. This figure illustrates the accuracy of the method with increasing aggregation along different sensor nodes. Again, while the signal is aggregated over multiple sensors as represented by the value of the X-axis, the abnormal occurrences are counted only over one of the sensors. One can estimate the number of abnormal occurrences to within 6% of the true value. The fact that a high accuracy is retained over a larger number of sensors tends to suggest that it is possible to determine abnormal signals at higher level sensor nodes without having to push the signal down to the lower levels.

Figure 9:
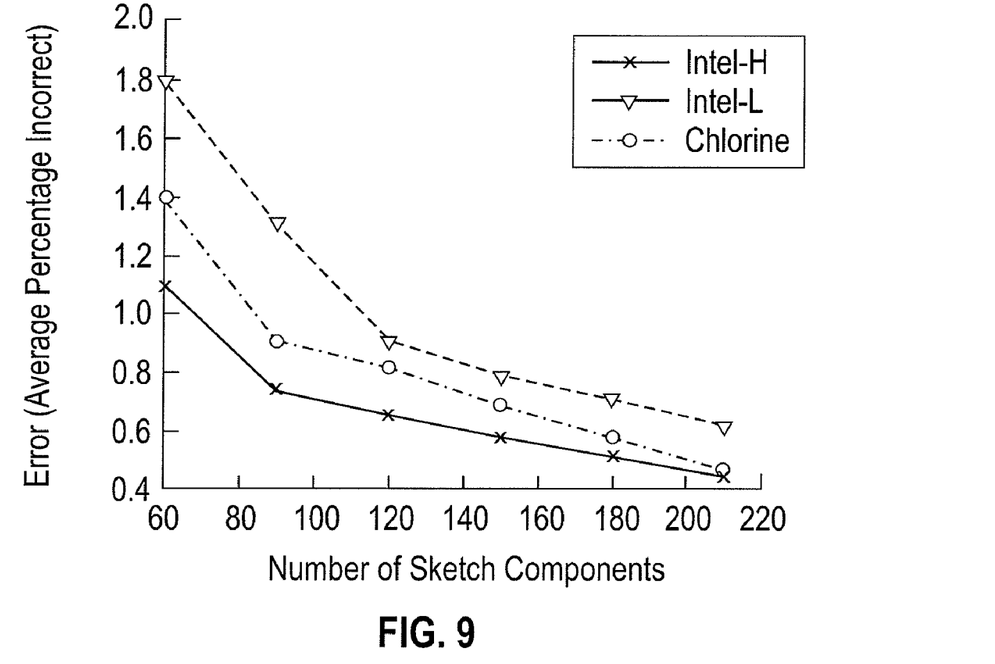
FIG. 9 depicts an estimation of a signal at a single time stamp, using a varying number of sketch components, according to an embodiment of the invention.

FIG. 9 depicts an estimation of a signal at a single time stamp, using a varying number of sketch components. This figure illustrates the error of estimation of a single data point in the stream. This is a challenging query since it implies effective reconstruction of any point in the entire data stream. As in the previous cases, the horizon was randomly chosen from the range [1000, 2000]. In this case, the error of estimation was expressed in terms of the percentage of time that the range of discretization interval picked was incorrect. The results from FIG. 9 show that the estimation error was less than 1% in most cases. This illustrates that the individual points in the data stream can be estimated to a very high degree of accuracy in most cases.

Figure 13:
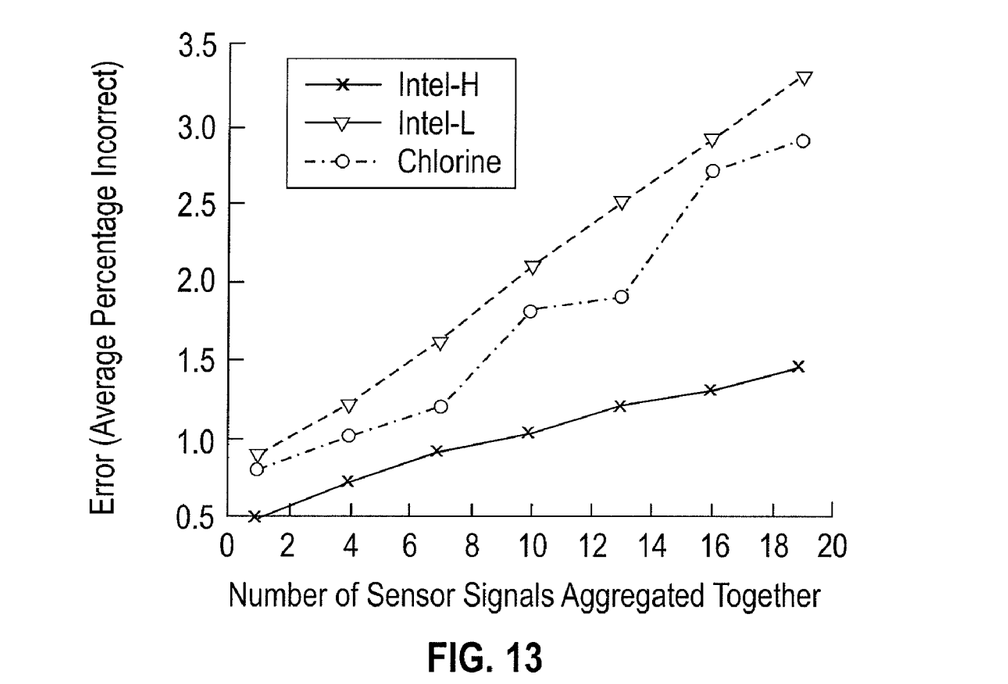
FIG. 13 illustrates an estimation of a signal at a single time stamp, using a varying level of aggregation, according to an embodiment of the invention.

FIG. 13 illustrates an estimation of a signal at a single time stamp, using a varying level of aggregation. This figure illustrates the error with increasing levels of aggregation when the number of sketch components was fixed at 90. As in the previous cases, the system was able to estimate the accuracy even when the sketch for a larger number of sensor series were aggregated together. For practical applications, these accuracies can be improved upon further by the estimation of moving averages. This is especially true for points in the distant history of the stream. In the case of points in the distant history, the behavior of individual data points is not of interest, only moving averages over small contiguous lengths of the stream. In such cases, the estimation can be performed with a smaller number of sketch components, especially when the local variations over these contiguous lengths are small.

Figure 10:
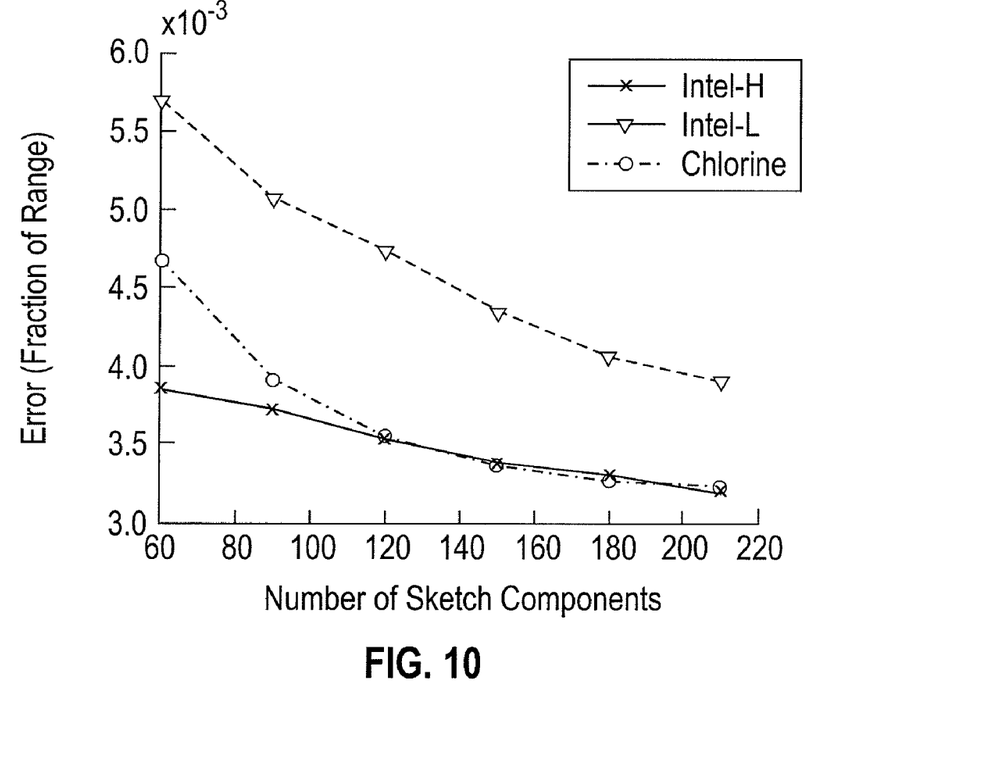
FIG. 10 illustrates a difference in signals between two sensors over a historical horizon using a varying number of sketch components, according to an embodiment of the invention.

Finally, the effectiveness of estimating the $L_2$-distance function was tested. As in previous cases, a horizon in the range [1000, 2000] was used. The results are illustrated in FIG. 10. FIG. 10 illustrates a difference in signals between two sensors over a historical horizon using a varying number of sketch components. As in the case of the average function, the errors are reported as a fraction of the range of values for the data streams. Because of normalization, the range is the same for both data streams over which the $L_2$-difference is determined. In this case, the error is less than 1% of the range, even when a small number of sketch components are used.

Figure 14:
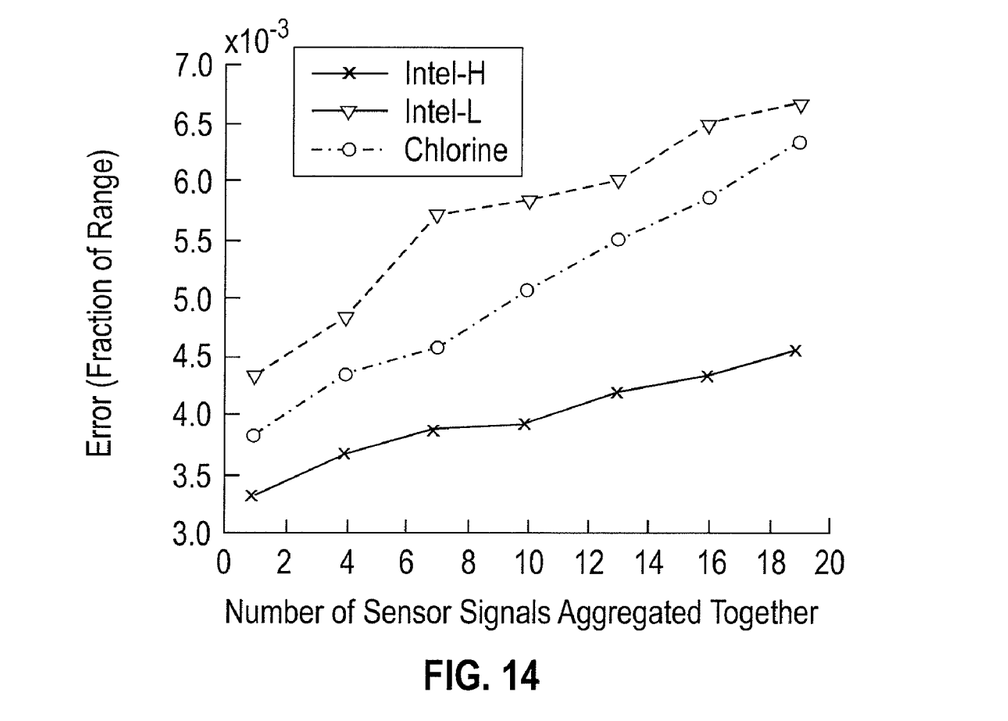
FIG. 14 depicts a difference in signals between two sensors over a historical horizon using a varying level of aggregation, according to an embodiment of the invention.

FIG. 14 depicts a difference in signals between two sensors over a historical horizon using a varying level of aggregation. This figure illustrates the effectiveness of the method with increasing level of aggregation of the sketch across different sensor nodes. In this case, the error is bounded above by a fraction $7 \times 10^{-3}$ of the range, and increases gradually with increasing levels of aggregation.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer-implemented method of querying a sensor network, said network being hierarchically organized sensor network with a global coordinator node at a top level which receives data from lower level intermediate nodes, said intermediate nodes being either leader nodes for lower level nodes or sensor nodes, wherein a sensor node i at a lowest level receives a signal Y(i,t) at time t, said method comprising the steps of:

constructing a sketch $$S_{wkt} = (S_{wkt}^1, \ldots, S_{wkt}^n)$$

for an internal node k from $$S_{wkt}^j = \sum_{i \in LeafDescendants(k)} \sum_{q=1}^{t} b_{wiq} \cdot r_{iq}^j,$$

wherein component $S_{wkt}^j$ is a sketch of a descendant of node k, $r_{it}^j$ is a random variable drawn from $\{-1, 1\}$ associated with each sensor node i and time instant t wherein index j refers to independently drawn instantiations of the random variable, the bit $B_{wit}$ in $\{0,1\}$ represents a state of sensor node i for signal value w=Y(i,t) at time t, and LeafDescendents(k) are the lowest level sensor nodes under node k, wherein said sketch is adapted for responding to queries regarding the state of said network, wherein said step of constructing is performed by a processor.

2. The method of claim 1, further comprising normalizing said signal for node i using $$z_i(t) = \frac{(Y(i, t) - \mu)}{\sigma},$$

wherein μ be the mean of said signal, and σ is the corresponding standard deviation.

3. The method of claim 2, further comprising quantizing said normalized signal in a range [−a, a] into Φ−2 intervals of equal length, and quantizing values outside the range [−a, a] into two separate intervals, for a total of Φ intervals, wherein bit $b_{wit}$ is 1 for only one value of $z_i(t)$ in $\{1, \ldots, \Phi\}$, and wherein bucketed identifies an interval in said range.

4. The method of claim 3, wherein a leaf node communicates a ⟨tickid,bucketid⟩ pair to a next higher level node at a time stamp tickid if bucketed of said received signal Y(i,t) has changed since a previous time stamp, and an intermediate level node communicates a triplet ⟨tickid, sensorid, bucketid⟩ for those nodes for whom bucketid has changed since the previous time stamp, wherein sensorid identifies the node whose bucketid is being updated.

5. The method of claim 1, comprising storing a historical snapshot of said sketch in a pyramidal storage pattern wherein snapshots for a level i are stored at clock times which are divisible by αhu i for a pre-defined parameter α>1, and a last $\alpha^l$ snapshots of each level are retained at any moment in time, for a pre-defined integer parameter l.

6. The method of claim 3, further comprising forming a horizon specific segment sketch $SS_{wk}(t_1,t_2)$ over a time period $(t_1, t_2)$ from $SS_{wk}(t_1,t_2)=S_{wkt_2}-S_{wkt_1}$ wherein $S_{wkt_1}$ and $S_{wkt_2}$ are sketches computed at times $t_1$ and $t_2$, respectively, and sum ming said segment sketch $SS_{wk}(t_1,t_2)$ over a set $M \subset \{1, \ldots, \Phi\}$ containing selected absolute values of said signal to obtain $$SR_k(M, t_1, t_2) = \sum_{w \in M} SS_{wk}(t_1, t_2).$$

7. The method of claim 6, further comprising calculating an expected value of $(SR_k^j(M,t_1,t_2))^2$ to find an expected number of signals in M for all descendents of node k in time interval $(t_2, t_1)$.

8. The method of claim 6, further comprising calculating a sketch derivative $V^j$ from $$V^j = \sum_{q=t_c-h'}^{t_c} SR_k^j(M, t_1, t_2) \cdot r_q^j,$$

and calculating an expected value of $V^j$ to determine a number of ticks $a_i$ with abnormally large signal occurrences at sensor node i.

9. A computer-implemented method of querying a sensor network, said network being hierarchically organized sensor network with a global coordinator node at a top level which receives data from lower level intermediate nodes, said intermediate nodes being either leader nodes for lower level nodes or sensor nodes, wherein a sensor node i at a lowest level receives a signal $Y(i,t)$ at time t, said method comprising the steps of:
receiving a query regarding a state of said sensor network, said query includes one or more of a time period, one nor more sensor identifiers, and a signal value range;
calculating a difference of sketch values evaluated at a beginning and an end of said time period, said sketch for a node k being an n-tuple representative signals received at past times for lower level sensors nodes of node k;
summing said difference of sketch values over a set of signal values, wherein said resulting segment sketch component is adapted to responding to said query; and constructing a sketch $$S_{wkt} = (S_{wkt}^1, \ldots, S_{wkt}^n)$$

for an internal node k from $$S_{wkt}^j = \sum_{i \in LeafDescendents(k)} \sum_{q=1}^{t} b_{wiq} \cdot r_{iq}^j,$$

wherein component $S^i{}_{wkt}$ is a sketch of a descendant of node k, $r^j_{it}$ is a random variable drawn from $\{-1, 1\}$ associated with each sensor node i and time instant t wherein index j refers to independently drawn instantiations of the random variable, the bit $B_{wit}$ in $\{0,1\}$ represents a state of sensor node i for a signal value $w=Y(i,t)$ at time t, and LeafDescendents(k) are the lowest level sensor nodes under node k, wherein said sketch is adapted for responding to queries regarding the state of said network;
wherein the steps of receiving a query, calculating a difference, summing a difference and constructing a sketch are performed by a processor.

10. The method of claim 9, wherein said signal for node i is normalized according to $$z_t(i) = \frac{(Y(i, t) - \mu)}{\sigma},$$

wherein $\mu$ is the mean of said signal, and $\sigma$ is the corresponding standard deviation, and said normalized signal is quantized over a range $\{-a, a\}$ into $\Phi$-2 intervals of equal length, and quantizing values outside the range $\{-a, a\}$ into two separate intervals, for a total of $\Phi$ intervals, wherein bit $b_{wit}$ is 1 for only one value of $z_t(i)$ in $\{1,\ldots,\}$.

11. The method of claim 9, wherein said difference of sketch values $SS_{wk}(t_1, t_2)$ over time period $(t_1, t_2)$ is calculated from $$SS_{wk}(t_1,t_2) = S_{wkt2} - S_{wkt1}$$

wherein $S_{wkt1}$ and $S_{wkt2}$ are sketches computed at times $t_1$ and $t_2$, respectively, and said segment sketch component $SS_{wk}(t_1, t_2)$ is summed over a set $M \subseteq \{1, \ldots, \Phi\}$ containing selected absolute values of said signal to obtain $$SR_k(M, t_1, t_2) = \sum_{w \in M} SS_{wk}(t_1, t_2).$$

12. The method of claim 9, wherein said query comprises determining an average signal value over a given time period.

13. The method of claim 9, wherein said query comprises determining a number of abnormal signal occurrences over a given time period.

14. The method of claim 9, wherein said query comprises determining a number of signal occurrences between predetermined thresholds in a subset of said network over a given time period.

15. The method of claim 9, wherein said query comprises determining a mean square distance in a signal between a pair of sensor nodes using data from a common ancestor node.

16. A program storage device readable by a computer, tangibly embodying a program of instructions executable by the computer to perform the method steps for querying a sensor network, said network being hierarchically organized sensor network with a global coordinator node at a top level which receives data from lower level intermediate nodes, said intermediate nodes being either leader nodes for lower level nodes or sensor nodes, wherein a sensor node i at a lowest level receives a signal $Y(i,t)$ at time t, said method comprising the steps of:
constructing a sketch $S_{wkt}=(S_{wkt}{}^1,\ldots,S_{wkt}{}^n)$ for an internal node k from $$S_{wkt}^j = \sum_{i \in LeafDescendents(k)} \sum_{q=1}^{t} b_{wiq} \cdot r_{iq}^j,$$

wherein component $S_{wkt}{}^j$ is a sketch of a descendent of node k, $r_{it}{}^j$ is a random variable drawn from $\{-1,1\}$ associated with each sensor node i and time instant t wherein index j refers to independently drawn instantiations of the random variable, the bit $b_{wit}$ in $\{0,1\}$ represents a state of sensor node i for signal value $w=Y(i,t)$ at time t, and LeafDescendents(k) are the lowest level sensor nodes under node k, wherein said sketch is adapted for responding to queries regarding a state of said network.

17. The computer readable program storage device of claim 16, wherein said signal for node i is normalized according to $$z_i(t) = \frac{(Y(i,t) - \mu)}{\sigma},$$

wherein $\mu$ is the mean of said signal, and $\sigma$ is the corresponding standard deviation, and said normalized signal is quantized over a range $[-a, a]$ into $\Phi-2$ intervals of equal length, and quantizing values outside the range $[-a, a]$ into two separate intervals, for a total of $\Phi$ intervals, wherein bit $b_{wit}$ is 1 for only one value of $z_i(t)$ in $\{1, \ldots, \Phi\}$.

18. The computer readable program storage device of claim 17, wherein the method further comprises forming a horizon specific segment sketch $SS_{wk}(t_1,t_2)$ over a time period $(t_1,t_2)$ from $SS_{wk}(t_1,t_2) = S_{wkt_2} - S_{wkt_1}$ wherein $S_{wkt_1}$ and $S_{wkt_2}$ are sketches computed at times $t_1$ and $t_2$, respectively, and summing said segment sketch $SS_{wk}(t_1,t_2)$ over a set $M \subseteq \{1, \ldots, \Phi\}$ containing selected absolute values of said signal to obtain $$SR_k(M, t_1, t_2) = \sum_{w \in M} SS_{wk}(t_1, t_2),$$

and calculating a sketch derivative $V^j$ from $$V^j = \sum_{q=t_c-h'}^{t_c} SR_k^j(M, t_1, t_2) \cdot r_q^j.$$

19. The computer readable program storage device of claim 18, wherein the method further comprises calculating an expected value of $(SR_k^j(M,t_1,t_2))^2$ to find an expected number of signals in M for all descendents of node k in time interval $(t_2,t_1)$, and calculating an expected value of $V^j$ to determine a number of ticks $a_t$ with abnormally large signal occurrences at sensor node i.

* * * * *